United States Patent [19]

Shiau

[11] Patent Number: 5,515,172
[45] Date of Patent: May 7, 1996

[54] APPARATUS AND METHOD FOR ENHANCED COLOR TO COLOR CONVERSION

[75] Inventor: Jeng-Nan Shiau, Webster, N.Y.

[73] Assignee: Xerox Corporation, Stamford, Conn.

[21] Appl. No.: 93,168

[22] Filed: Jul. 19, 1993

[51] Int. Cl.$^6$ .................................. H04N 1/21; G03F 3/08
[52] U.S. Cl. .......................... 358/298; 358/518; 358/520; 358/521
[58] Field of Search ...................................... 358/518, 520, 358/521, 298, 500

[56] References Cited

U.S. PATENT DOCUMENTS

| | | | |
|---|---|---|---|
| 4,500,919 | 2/1985 | Schreiber | 358/518 |
| 4,972,257 | 11/1990 | Birnbaum et al. | 358/80 |
| 5,105,469 | 4/1992 | MacDonald et al. | 358/522 |
| 5,200,832 | 4/1993 | Taniuchi et al. | 358/300 |
| 5,202,935 | 4/1993 | Kanamori et al. | 358/500 |

OTHER PUBLICATIONS

Patent Abstracts of Japan, vol. 17, No. 188 (E–1349), 13 Apr. 1993 and Jp-A-04 336869 (Fuji Xerox Co. Ltd.) 25 Nov. 1992.
*Webster's II New Riverside University Dictionary.* Eds Anne H. Soukhanov et al. Boston, MA: Houghton Mifflin Company, 1988.

*Primary Examiner*—Nancy Le
*Assistant Examiner*—Raquel Yvette Gordon
*Attorney, Agent, or Firm*—Michael J. Nickerson

[57] ABSTRACT

The present invention changes a color corresponding to a source color to a destination color by initially selecting a target source color and a target destination color. The selected target source color is converted to a source hue value, a source chroma reference value, and a source lightness reference value, and the selected target destination color is converted to a destination hue value, a destination chroma reference value, and a destination lightness reference value. A circuit then generates a first set of source/destination chroma and a first set of source/destination lightness values representing source/destination chroma and lightness relationships, respectively, for sources values in a range from the source chroma and lightness reference values, respectively, to minimum source chroma and lightness values, respectively, using a first and third function, respectively. The circuit also generates a second set of source/destination chroma values and a second set of source/destination lightness values representing source/destination chroma and lightness relationships, respectively, for source values in a range from the source chroma and lightness reference values, respectively, to maximum source chroma and lightness values, respectively, using a second and fourth function, respectively. These values are stored. Received color data is converted to a color hue value, a color chroma value, and a color lightness value. A comparator determines if the color hue value corresponds to the source hue value. When the comparator determines that the color hue value corresponds to the source hue value, destination chroma and lightness values associated with the source chroma and lightness values, respectively, that corresponds to the color chroma and lightness values, respectively, are selected based on the stored source/destination chroma and lightness relationships, respectively. The destination hue value and the selected destination chroma and lightness values are converted into output color data representing the destination color.

30 Claims, 13 Drawing Sheets

APPARATUS AND METHOD FOR ENHANCED COLOR TO COLOR CONVERSION

FIELD OF THE PRESENT INVENTION

The present invention is directed to an apparatus and method for converting images of one color to images of another color. More particularly, the present invention is directed to an apparatus and method for color conversion wherein the target color is converted to a designated color while maintaining its gradation characteristics and a high quality.

BACKGROUND OF THE PRESENT INVENTION

Conventional copiers, digital copiers in particular, offer various features for image editing in reproducing a document. These features may include magnification, reduction, erasing of selected areas, image shift and repeat, creation of textural patterns, color creation, and color conversion. For example, a conventional color copier can enable a user to designate a color in the document and convert this designated color to another color. With the color conversion function, the user selects a source color and a destination color such that the reproduced document will have all areas corresponding to the source color changed to the destination color. In a conventional digital copier, there may be a choice of retaining the source area gradation or not. The gradation mode is appropriate for pictorial images, while gradation can be excluded when constant colors are used; i.e., in business graphics.

Color conversion involves the detection of pixels whose color is close to that of the selected source color and subsequently changes the source color to the user selected destination color. The color video data from a scanner is usually in the form of red, green and blue (RGB) intensity. In order to identify pixels belonging to a particular color, it is possible to check the RGB values directly. However, simply checking the RGB values to identify pixels of a certain color and perform changes therefrom is not always satisfactory.

Conventionally, color conversion operations have preferred to identify the particular color by studying the hue, chroma, and lightness of the color after converting the RGB values to a hue, chroma, and lightness space. Color spaces of this nature include the Munsell color specification, HSV, HLS (a space used in computer graphics), HSI (a color spaced used in image processing), and $L^*C^*h$ which is a polar coordinate formed of $L^*a^*b^*$.

Hue is defined generically by the common term color. In other words, such common terms as red, yellow, green, and blue refer to hue. It is generally represented as an angular coordinate in the hue/chroma/lightness color space. The vividness or dullness of a color is described by saturation or chroma. In other words, chroma or saturation indicates how close a color is either to gray or to its pure hue. It is represented as a radial coordinate in the hue/chroma/lightness color space. The chroma changes on a horizontal plane with the gray at the center and the colors becoming more vivid as the chroma value moves outwardly in each hue direction. The vertical dimension in the hue/chroma/lightness space is the lightness or intensity. This value refers to the luminous intensity with black and white at the extremes.

To perform color conversion, the RGB values of a color are converted to the corresponding hue, chroma, and lightness representation. Upon color detection, the hue, chroma, and lightness values of the scanned color are converted to the hue, chroma and lightness values of a new destination color. The converted hue, chroma and lightness values can be transformed back to RGB values or the CMYK values for color output to a printer. An example of such a system is disclosed in U.S. Pat. No. 4,500,919 to Schreiber.

One version of color conversion is the monochrome mode. In this mode, an entire document is reduced to gray or a single hue. To obtain gray output, the chroma value of all pixels are changed to zero and the hue value becomes undefined while the lightness value remains unchanged. Such a monochrome mode method is illustrated in FIG. 1.

In conventional non-monochrome color conversion systems, only those pixels that have a color value close to the user selected source color are changed. Thus, it is necessary to check if a pixel is in the vicinity of the selected source color. If the pixel is in the vicinity of the selected source color, the appropriate color change is applied to that pixel. The actual color conversion process depends upon the selected source and destination color and can be separated into color to color, color to gray, and gray to color modes. The user can also select between a gradation mode and a no gradation mode. A gradation mode retains the shading of the source area in the output, while a no gradation mode renders a constant color.

In the following discussions, $h_s$, $C^*_s$, $L^*_s$, and $h_d$, $C^*_d$ and $L^*_d$ denote the hue, chroma, and lightness values of the user selected source and destination colors, respectively. The symbols $h$, $C^*$, $L^*$, and $h'$, $C^{*'}$, $L^{*'}$, denote the pixel values before and after the color conversion process. The gray to color conversion mode requires the user to specify the $L^*_{max}$, and $C^*_{max}$ limits so as to define the source gray pixels. The color to color and color to gray conversion modes may require the user to specify the source color range in hue angles, $h_{min}=h_s-dh$, $h_{max}=h_s+dh$, and a minimum chroma value, $C^*_{min}$. The hue angles $h_{min}$ and $h_{max}$ define a hue window a half width $dh$. An example of a hue window is illustrated in FIG. 2. It is noted that $h_{max}>h_{min}$ is the usual case with respect to a hue window. However, if the hue window straddles the zero degree angle, $h_{max}$ will be less than $h_{min}$.

The hue angle is defined in the range from 0° to 360°. Thus, the hue value of the pixel needs to be normalized. In the normalization process, the following routines are carried out until $h$ is within the range of 0° to 360°. if $h$ is less than 0°, $h=h+360°$, and if $h$ is greater than or equal to 360°, $h=h-360°$.

For the gray to color mode, the chroma of a pixel needs to be checked against an upper bound $C^*_{max}$ to insure that the pixel under consideration is gray and is within the specified lightness range. If the pixel in question is a gray pixel, the hue and chroma are changed to that of the selected destination color and the lightness value change would depend upon the choice of gradation.

For the color to gray mode, the color detection consists of checking if the hue is within the window of the source color. Once the pixel is determined to be within the hue window of the source color, the chroma value of the pixel in question may be checked against a lower limit chroma value $C^*_{min}$ to insure that it is not a gray pixel. Once the pixel is determined to be equivalent to a source pixel, the identified pixel has its chroma value set to zero and its hue value becomes undefined.

The color to color mode requires a slightly different process. For the color to color mode, the color detection consists of checking if the hue is within the window of the source color. Once the pixel is determined to be within the hue window of the source color, the chroma value of the pixel in question may be checked against a lower limit chroma value $C^*_{min}$ to insure that it is not a gray pixel. Once the pixel is determined to be equivalent to a source pixel, the gradation mode is checked. If there is no gradation mode, the color to color mode process sets the hue, chroma, and lightness values of the pixel to that of the destination color. For the gradation mode, the conventional device sets the hue value to that of the destination color while maintaining the chroma and lightness values unchanged to provide gradation.

An example of a conventional device for converting one color to another color is described in U.S. Pat. No. 4,972,257, issued on Nov. 20, 1990, entitled "Operator Adjustable Color Image Processing." This U.S. Patent discloses a device which allows a user to convert an image of one color to the same image having a new color. During the conversion process, the conversion of the hue, saturation, and lightness properties are adjusted manually by the operator. In other words, once the color of the pixel in question is determined to be equivalent to the source color, the image data of the pixel is converted to a predetermined hue value, a predetermined saturation value, and a predetermined lightness value. The establishment of the predetermined values is not dependent upon the saturation (chroma) or lightness (intensity) values of either the source color, the destination color, or the color of the pixel in question because the same predetermined saturation and lightness values are generated for each conversion process, only the hue values change from conversion process to conversion process. After establishing the hue, saturation, and lightness values, the operator adjusts these various values to realize the desired color and gradation.

Another example for converting one color to another color is illustrated in FIG. 3. In FIG. 3, it is determined at step S10 whether the incoming pixel value is a gray source. If the pixel value in question is a gray source, step S11 determines whether the pixel value has a chroma value less than the maximum chroma value ($C^*_{max}$). If the chroma value of the pixel in question is not less than $C^*_{max}$, step S19 establishes the hue, chroma, and lightness values to remain unchanged in the pixel in question.

However, if step S11 determines that the chroma value of the pixel in question is less than $C^*_{max}$, step S12 determines whether the lightness value of the pixel in questions is greater than a minimum lightness value ($L^*_{min}$) and less than a maximum lightness value ($L^*_{max}$). If this condition is not satisfied at step S12, the hue, chroma, and lightness values are established as described above with respect to step S19.

However, if the lightness value of the pixel in question does satisfy the conditions of step S12, step S13 determines whether a gradation mode has been selected. If a gradation mode has been selected, step S20 establishes the hue and chroma values to be the destination hue and chroma values while allowing the lightness value to remain unchanged. On the other hand, if step S13 determines that no gradation mode has been selected, step S14 establishes the hue, chroma, and lightness values to be the destination hue, chroma, and lightness values, respectively.

If step S10 determines that the source is not a gray source, step S15 determines whether the maximum hue value ($h_{max}$) of the hue window is greater than or equal to the minimum hue value ($h_{min}$) for the hue window. If $h_{max}$ is greater than $h_{min}$, step S16 determines whether the hue value of the pixel in question is greater than $h_{min}$ of the hue window and less than $h_{max}$ of the hue window.

On the other hand, if step S15 determines that $h_{max}$ for the hue window is not greater than $h_{min}$ for the hue window, step S17 determines whether the hue value for the pixel in question is greater than $h_{min}$ for the hue window or less than $h_{max}$ for the hue window. If the hue value of the pixel in question does not meet the condition of step S16 or the condition of step S17, the hue, chroma, and lightness values are established as discussed above with respect to step S19.

However, if the hue value of the pixel in question meets the conditions of either step S16 or step S17, step S18 determines whether the chroma value of the pixel in question is greater than a minimum chroma value ($C^*_{min}$). If step S18 determines that the chroma value of the pixel in question is not greater than $C^*_{min}$, the hue, chroma, and lightness values remain unchanged as discussed above with respect to step S19. On the other hand, if the chroma value of the pixel in question is greater than $C^*_{min}$, step S21 determines whether the destination color is a gray destination.

If the destination color is a gray destination, step S22 determines whether a gradation mode has been selected. If a gradation mode has been selected, step S30 establishes the hue value as being undefined, the chroma value as being equal to zero, and allows the lightness value to remain unchanged. However, if step S22 determines that no gradation has been selected, step S23 establishes the hue value as being undefined, the chroma value as zero, and the lightness value as being equal to the destination lightness value.

On the other hand, if step S21 determines that the destination color is not a gray destination, step S24 determines whether a gradation mode has been selected. If no gradation mode has been selected, step S34 establishes the hue value as the destination hue value, the chroma value as the destination chroma value, and the lightness value as the destination lightness value. However, if a gradation has been selected in step S24, step S39 establishes the hue value as the destination hue value, while allowing the chroma value and the lightness value to remain unchanged.

Although conventional devices have a color conversion feature with gradation, the gradation is less than satisfactory in most instances. For example, in the method described with respect to FIG. 3, if the original color is different in saturation or lightness from the user selected destination color, the output color will not quite match the selected color. This problem is caused because the source color has different average chroma and lightness values from that of the destination color, and these values have not been changed. Moreover, simply setting the chroma and lightness values to that of the destination color will end up with a color to color conversion that contains no true gradation. This causes many problems when attempting to reproduce a high quality document having the original colors of the image converted to certain destination colors. On the other hand, U.S. Pat. No. 4,972,257, issued on Nov. 20, 1990, entitled "Operator Adjustable Color Image Processing" provides the operator with the opportunity to adjust the hue, saturation, and lightness values manually so as to match the desired destination color with the selected source color.

To realize a proper color to color conversion automatically so as to provide high speed copying without operator intervention while maintaining a true gradation capability, the system or method must be capable of internally and automatically adjusting the chroma and lightness values of the pixels in question such that the color conversion process can generate converted values which closely resemble the destination color.

OBJECTS AND SUMMARY OF THE PRESENT INVENTION

It is an object of the present invention, therefore, to provide a system or method that readily converts color data representing a source color to color data representing a destination color while maintaining integrity and gradation.

It is another object of the present invention to have the exact source value mapped to that of the destination value while having other source values mapped to the corresponding destination values through interpolation.

To achieve some of the objectives described above, the present invention changes a color corresponding to a source color to a destination color. Initially, the present invention selects a target source color and a destination color. The inputted target source color is converted to a source hue value, a source chroma reference value, and a source lightness reference value, and the inputted target destination color is converted to a destination hue value, a destination chroma reference value, and a destination lightness reference value. A first set of source/destination chroma values representing a source/destination chroma relationship for sources values in a range from the source chroma reference value to a minimum source chroma value is generated using a first function, and a second set of source/destination chroma values representing a source/destination chroma relationship for source values in a range from the source chroma reference value to a maximum source chroma value is generated using a second function. These values are stored. A first set of source/destination lightness values representing a source/destination lightness relationship for sources values in a range from the source lightness reference value to a minimum source lightness value is generated using a third function, and a second set of source/destination lightness values representing a source/destination lightness relationship for source values in a range from the source lightness reference value to a maximum source lightness value is generated using a fourth function. These values are also stored.

The present invention then receives color data and converts the color data to a color hue value, a color chroma value, and a color lightness value. When it is determined that the color hue value corresponds to the source hue value, a destination chroma value associated with the source chroma value that corresponds to the color chroma value is selected based on the stored source/destination chroma relationship. Also, when it is determined that the color hue value corresponds to the source hue value, a destination lightness value associated with the source lightness value that corresponds to the color lightness value is selected based on the stored source/destination lightness relationship. The destination hue value, the selected destination chroma and lightness values are converted into output color data representing the destination color.

Another aspect of the present invention changes a color corresponding to a source color to a destination color. Initially, the present invention selects a target source color and a destination color. The inputted target source color is converted to a source hue value and a source lightness reference value, and the inputted target destination color is converted to a destination hue value and a destination lightness reference value. A first set of source/destination lightness values representing a source/destination lightness relationship for sources values in a range from the source lightness reference value to a minimum source lightness value is generated using a first function, and a second set of source/destination lightness values representing a source/destination lightness relationship for source values in a range from the source lightness reference value to a maximum source lightness value is generated using a second function. These values are stored. The present invention then receives color data and converts the color data to at least a color hue value and a color lightness value. When it is determined that the color hue value corresponds to the source hue value, a destination lightness value associated with the source lightness value that corresponds to the color lightness value is selected based on the stored source/destination lightness relationship. The destination hue value and the selected destination lightness value are converted into output color data representing the destination color.

A further aspect of the present invention changes a color corresponding to a source color to a destination color. Initially, the present invention selects a target source color and a destination color. The inputted target source color is converted to a source hue value and a source chroma reference value, and the inputted target destinabion color is converted to a destination hue value and a destination chroma reference value. A first set of source/destination chroma values representing a source/destination chroma relationship for sources values in a range from the source chroma reference value to a minimum source chroma value is generated using a first function, and a second set of source/destination chroma values representing a source/destination chroma relationship for source values in a range from the source chroma reference value to a maximum source chroma value is generated using a second function. These values are stored. The present invention then receives color data and converts the color data to at least a color hue value and a color chroma value. When it is determined that the color hue value corresponds to the source hue value, a destination chroma value associated with the source chroma value that corresponds to the color chroma value is selected based on the stored source/destination chroma relationship. The destination hue value and the selected destination chroma value are converted into output color data representing the destination color.

A still further aspect of the present invention changes a color corresponding to a target source color to a destination color. A target source color and a corresponding target destination color is selected. The selected target source color is converted into first, second, and third target source values representing a three-dimensional color space, the first target source value representing a source hue value, and converts the selected target destination color into first, second, and third target destination values representing a same three-dimensional color space, the first target destination value representing a destination hue value. Color data is also received and converted into first, second, and third color values representing the three-dimensional color space, the first color value representing a hue value. A second destination value is generated using a first function when the second color value is in a range from the second source target value to a predetermined minimum second source value or the second destination value is generated using a second function when the second color value is in a range from the second source target value to a predetermined maximum second source value. Lastly, output color data representing the destination color is generated based on the first destination target value and the generated second destination value when it is determined that the first color value corresponds to the first source target value.

A fifth aspect of the present invention selects a target source color and a corresponding target destination color and converts the selected target source color into a first target source value of a three-dimensional color space, the first target source value representing a source hue value, and the selected target destination color into a first destination value in a same three-dimensional color space, the first destination value representing a target destination hue value. Color data is also received and converted into first, second, and third color values representing the three-dimensional color space, the first color value representing a color hue value. A plurality of second destination values, each second destination value corresponding to a second source value in a range from a predetermined minimum second source value to a predetermined maximum second source value are pre-stored. A second destination value that corresponds to an inputted second color value is outputted, the inputted second color value being used as the second source value for determining the second destination value, when it is determined that the first color value corresponds to the first target source value and it is determined that the second color value is within a predetermined range of values. Lastly, output color data representing the destination color is generated based on the first destination value and the outputted second destination value.

Further objects and advantages of the present invention will become apparent from the following description of the various embodiments and characteristic features of the present invention.

BRIEF DESCRIPTION OF THE DRAWINGS

The following is a brief description of each drawing used to describe the present invention, and thus, are being presented for illustrative purposes only and should not be limited of the scope of the present invention, wherein.

DETAILED DESCRIPTION OF THE DRAWINGS

Figure 1:
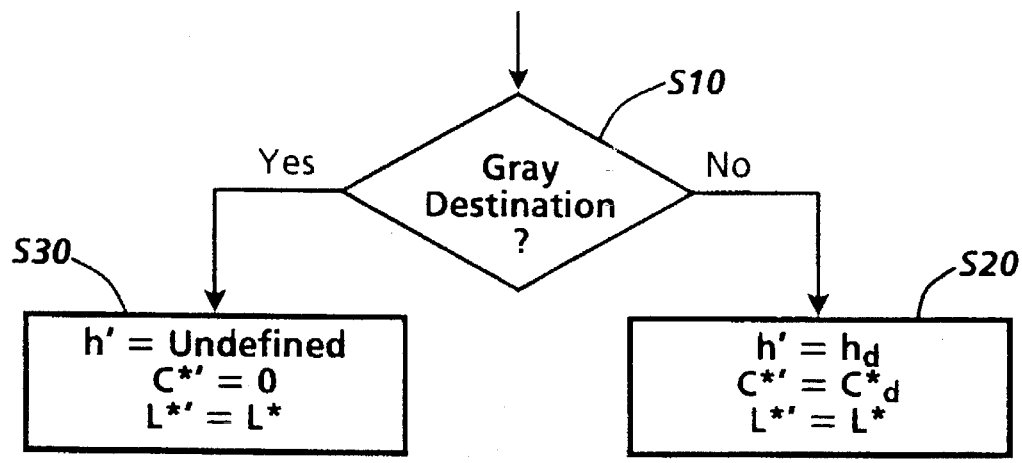
FIG. 1 illustrates a conventional flow chart for carrying out a color conversion process in a monochrome mode.
Figure 2:
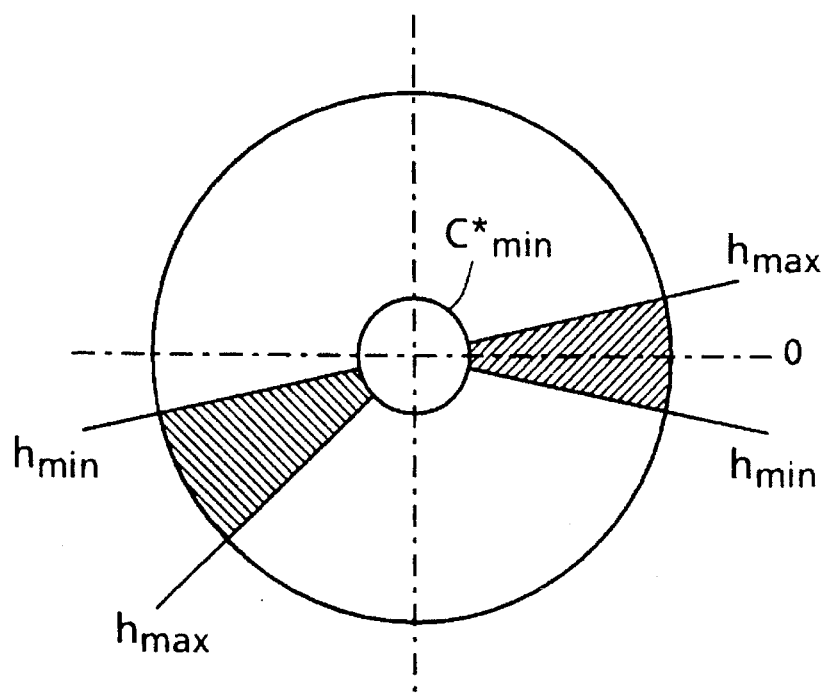
FIG. 2 illustrates a prior art schematic of a hue window in $L^*C^*h$ space.
Figure 3:
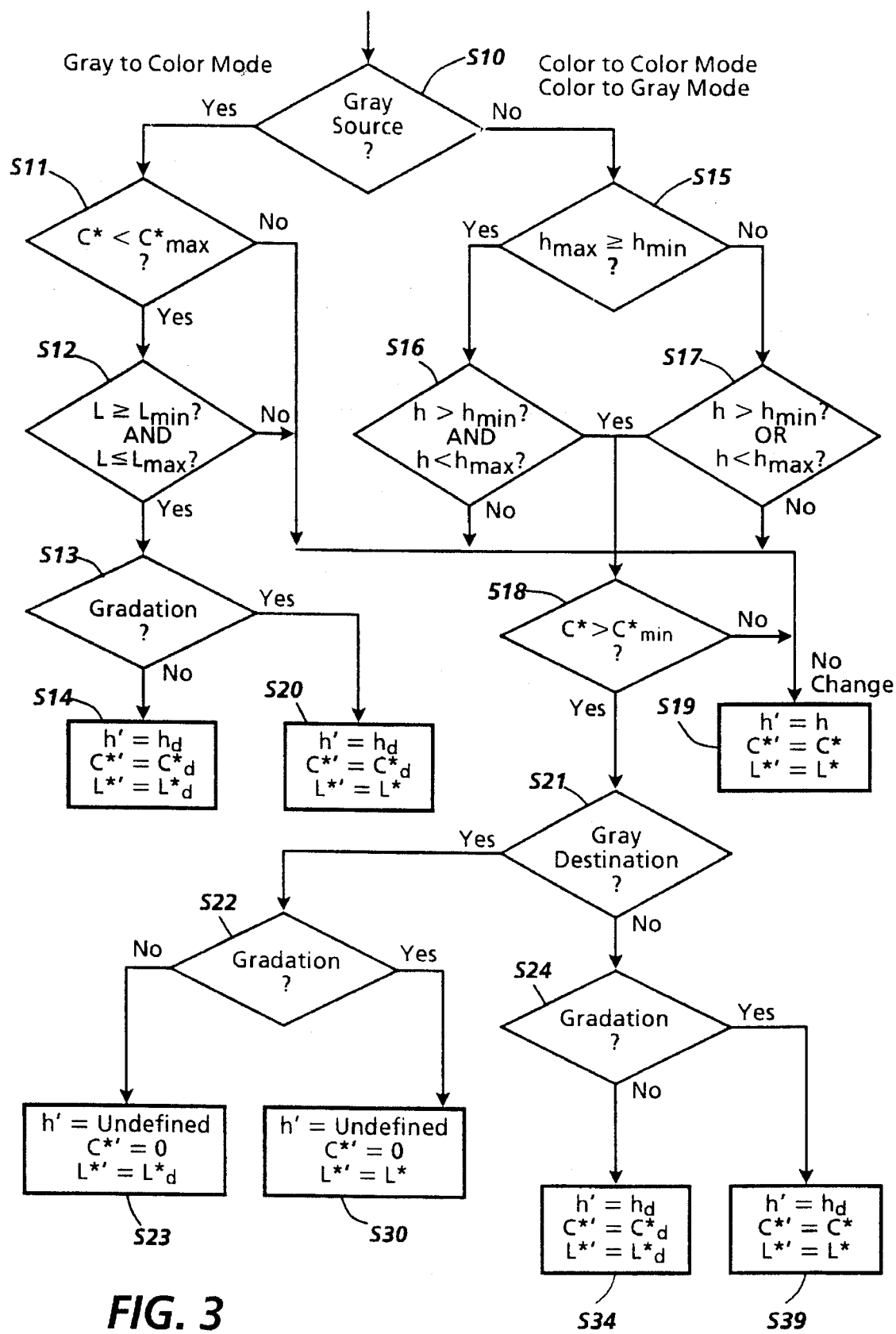
FIG. 3 illustrates a flow chart showing a prior art method for carrying out a color to color conversion process.

The following will be a detailed description of the drawings illustrating the present invention. In this description, as well as in the drawings, like reference numerals represent the devices or circuits or equivalent circuits which perform the same or equivalent functions.

In the following discussions with respect to the present invention, $h_s$, $C^*_s$, $L^*_s$, and $h_d$, $C^*_d$ and $L^*_d$ denote the hue, chroma, and lightness values of the user selected source and destination colors, respectively. The symbols h, $C^*$, $L^*$, and h', $C^{*'}$, $L^{*'}$, denote the pixel values before and after the color conversion process. The gray to color conversion mode requires the user to specify the $L^*_{max}$, and $C^*_{max}$ limits so as to define the source gray pixels. The color to color and color to gray conversion modes may require the user to specify the source color range in hue angles, $h_{min}=h_s-dh$, $h_{max}=h_s+dh$, and a minimum chroma value, $C^*_{min}$. The hue angles $h_{min}$ and $h_{max}$, define a hue window with a half width dh.

The hue angle is defined in the range from 0° to 360°. Thus, the hue value of the pixel needs to be normalized. In the normalization process, the following routines are carried out until h is within the range of 0° to 360°. if h is less than 0°, h=h+360°, and if h is greater than or equal to 360°, h=h−360°.

Figure 4:
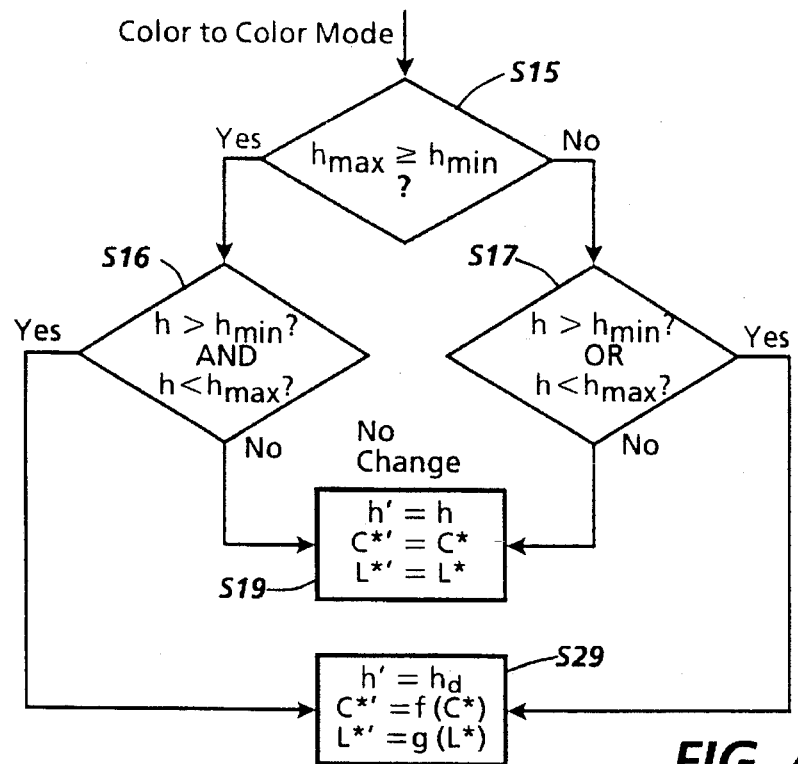
FIG. 4 illustrates a flow chart showing one embodiment of the present invention which carries out a color to color conversion in a color to color mode wherein gradation is automatic.

FIG. 4 illustrates one embodiment of the present invention. In FIG. 4, step S15 determines whether the maximum hue value ($h_{max}$) of the hue window is greater than or equal to the minimum hue value ($h_{min}$) for the hue window. If $h_{max}$ is greater than $h_{min}$, step S16 determines whether the hue value of the pixel in question is greater than $h_{min}$ of the hue window and less than $h_{max}$ of the hue window.

On the other hand, if step S15 determines that $h_{max}$ for the hue window is not greater than $h_{min}$ for the hue window, step S17 determines whether the hue value for the pixel in question is greater than $h_{min}$ for the hue window or less than $h_{max}$ for the hue window. If the hue value of the pixel in question does not meet the condition of step S16 or the condition of step S17, the hue, chroma, and lightness values are established at step S19. At step S19, the hue, chroma, and lightness values remain unchanged for the pixel in question. However, if the hue value of the pixel in question meets the conditions of either step S16 or step S17, step S29 establishes the hue, chroma, and lightness values according to the functional relationships which will be discussed in more detail below.

Figure 5:
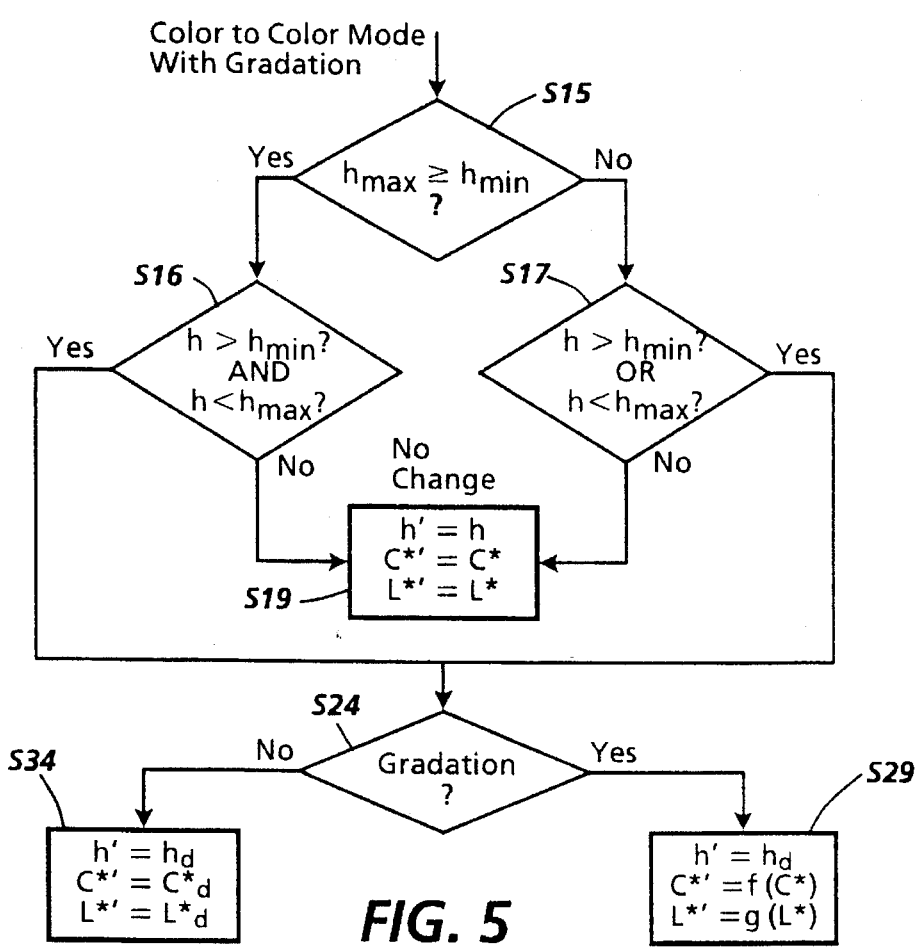
FIG. 5 illustrates a flow chart showing a further embodiment of FIG. 4 wherein the color to color conversion process allows the selection between gradation and no gradation.

FIG. 5 illustrates another embodiment of the present invention. In FIG. 5, the determination of the hue value is the same as described above with respect to FIG. 4. FIG. 5 modifies FIG. 4 with the addition of a gradation branch.

More specifically, if the hue value of the pixel in question does not meet the condition of step S16 or the condition of step S17, the hue, chroma, and lightness values are established at step S19 as discussed above with respect to FIG. 4. However, if the hue value of the pixel in question meets the conditions of either step S16 or step S17, step S24 determines whether a gradation mode has been selected. If no gradation mode has been selected, step S34 establishes the hue value as the destination hue value, the chroma value as the destination chroma value, and the lightness value as the destination lightness value. However, if a gradation has been selected in step S24, step S29 establishes the hue value, the chroma value, and the lightness value as discussed above with respect to FIG. 4.

Figure 6:
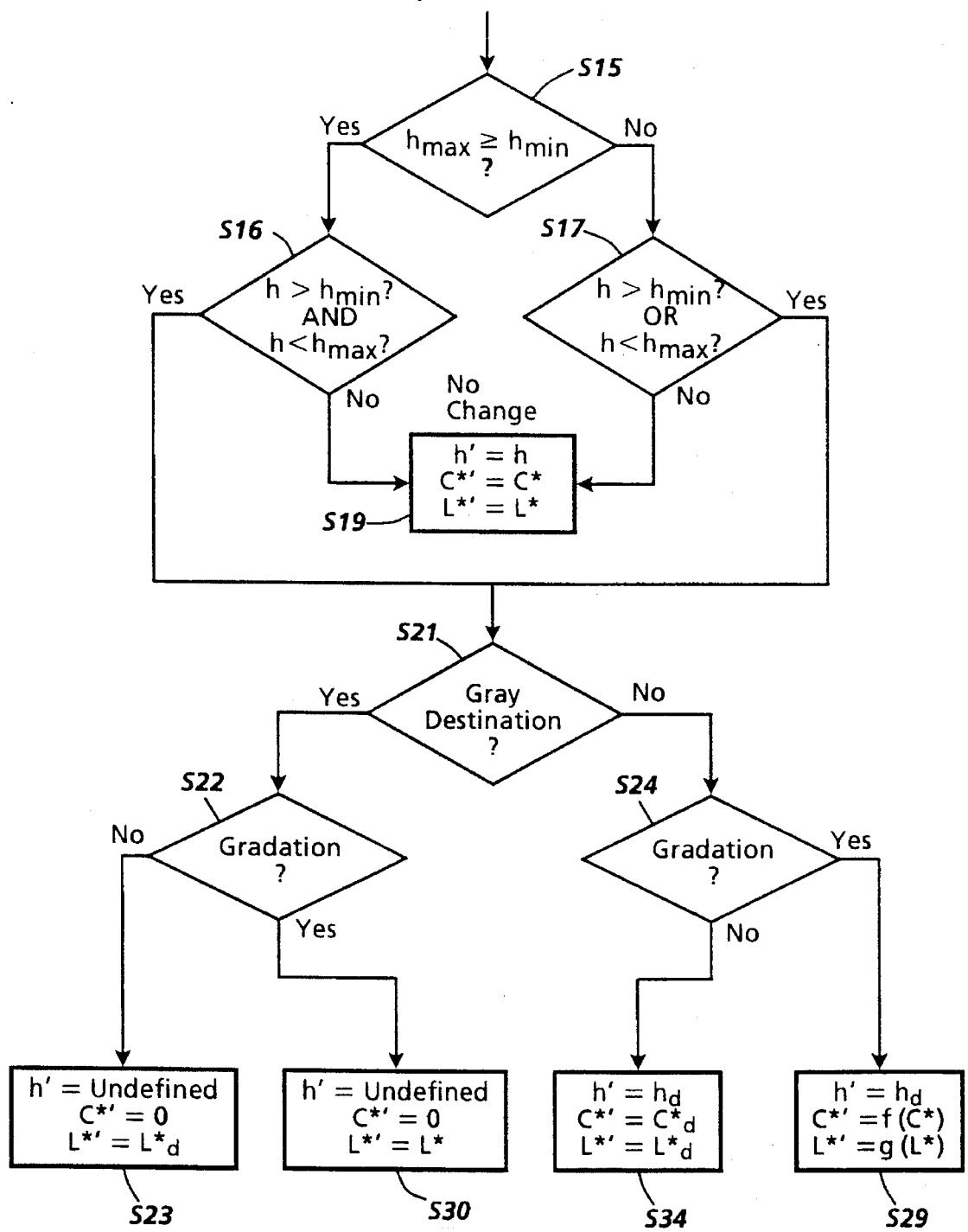
FIG. 6 illustrates a flow chart showing a third embodiment of the present invention which carries out a color to color conversion process having a color to color mode with gradation and a color to gray mode with gradation.

FIG. 6 illustrates a third embodiment of the present invention. In FIG. 6, the method steps having the same labels perform the same functions as described above with respect to FIGS. 4 and 5. FIG. 6 modifies FIG. 5 with the addition of a gray destination branch.

More specifically, if the hue value of the pixel in question meets the conditions of either step S16 or step S17, step S21 determines whether the destination color is a gray destination. If the destination color is a gray destination, step S22 determines whether a gradation mode has been selected. If a gradation mode has been selected, step S30 establishes the hue value as being undefined, the chroma value as being equal to zero, and allows the lightness value to remain unchanged. However, if step S22 determines that no gradation has been selected, step S23 establishes the hue value as being undefined, the chroma value as zero, and the lightness value as being equal to the destination lightness value.

On the other hand, if step S21 determines that the destination color is not a gray destination, step S24 determines whether a gradation mode has been selected. If no gradation mode has been selected, step S34 establishes the hue value as the destination hue value, the chroma value as the destination chroma value, and the lightness value as the destination lightness value. However, if a gradation has been selected in step S24, step S29 establishes the hue value, the chroma value, and the lightness value in the same manner as FIG. 4.

Figure 7:
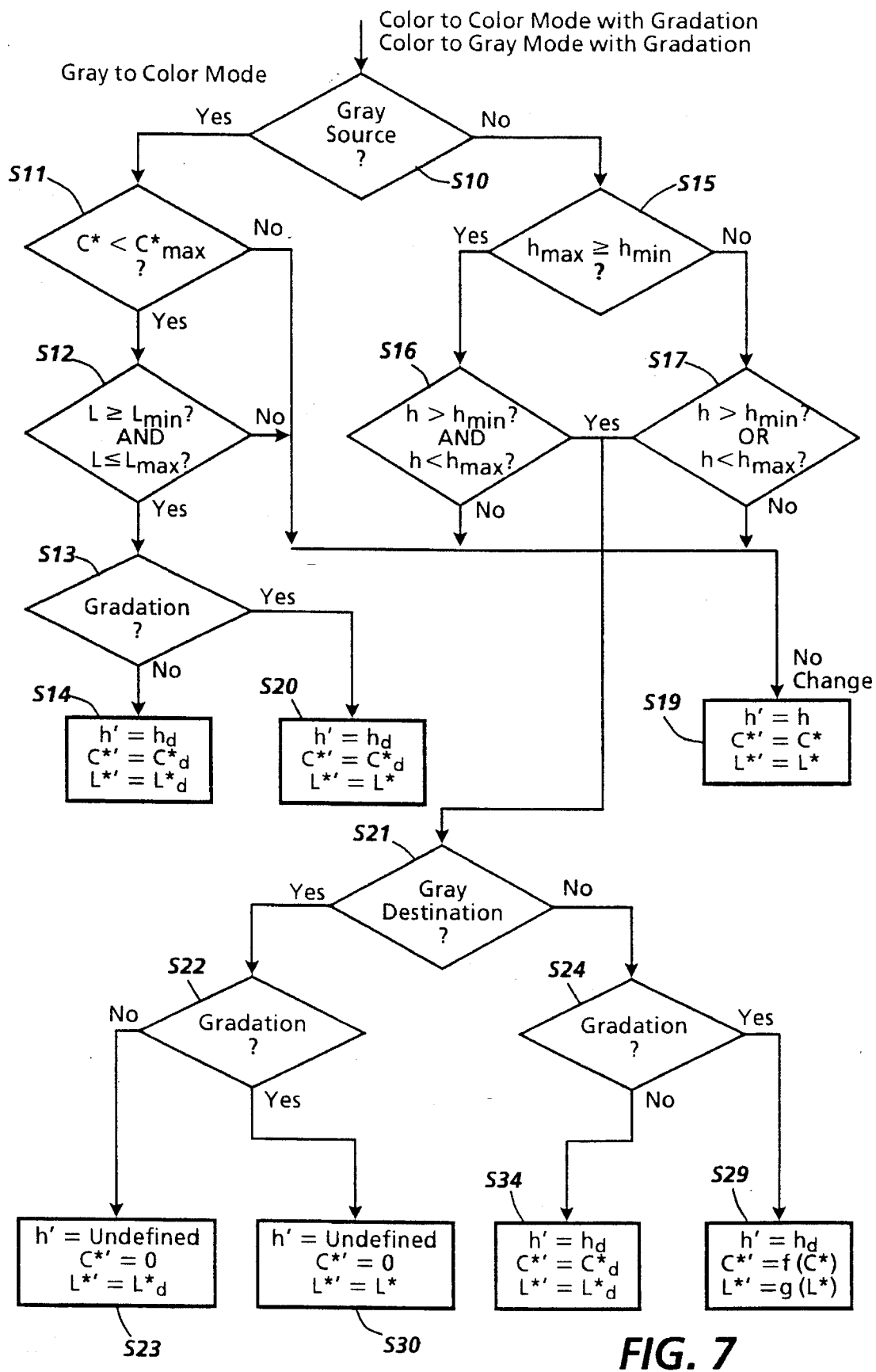
FIG. 7 illustrates a flow chart showing a fourth embodiment of the present invention which carries out a color to color conversion process having a color to color mode with gradation, a color to gray mode with gradation, and a gray to color mode with gradation.

FIG. 7 illustrates a fourth embodiment of the present invention. In FIG. 7, the method steps having the same labels perform the same functions as described above with respect to FIGS. 4, 5, and 6. FIG. 7 modifies FIG. 6 with the addition of a gray source branch.

More specifically, it is determined at step S10 whether the incoming pixel value is a gray source. If the pixel value in question is a gray source, step S11 determines whether the pixel value has a chroma value less than the maximum chroma value ($C^*_{max}$). If the chroma value of the pixel in question is not less than $C^*_{max}$, step S19 establishes the hue, chroma, and lightness values to remain unchanged in the pixel in question.

However, if step S11 determines that the chroma value of the pixel in question is less than $C^*_{max}$, step S12 determines whether the lightness value of the pixel in questions is greater than a minimum lightness value ($L^*_{min}$) and less than a maximum lightness value ($L^*_{max}$). If this condition is not satisfied at step S12, the hue, chroma, and lightness values are established as described above with respect to step S19.

If the lightness value of the pixel in question does satisfy the conditions of step S12, step S13 determines whether a gradation mode has been selected. If a gradation mode has been selected, step S20 establishes the hue and chroma values to be the destination hue and chroma values while allowing the lightness value to remain unchanged. On the other hand, if step S13 determines that no gradation mode has been selected, step S14 establishes the hue, chroma, and lightness values to be the destination hue, chroma, and lightness values, respectively. If step S10 determines that the source is not a gray source, the remaining process is the same as described with respect to FIG. 6 beginning at step S15.

Figure 8:
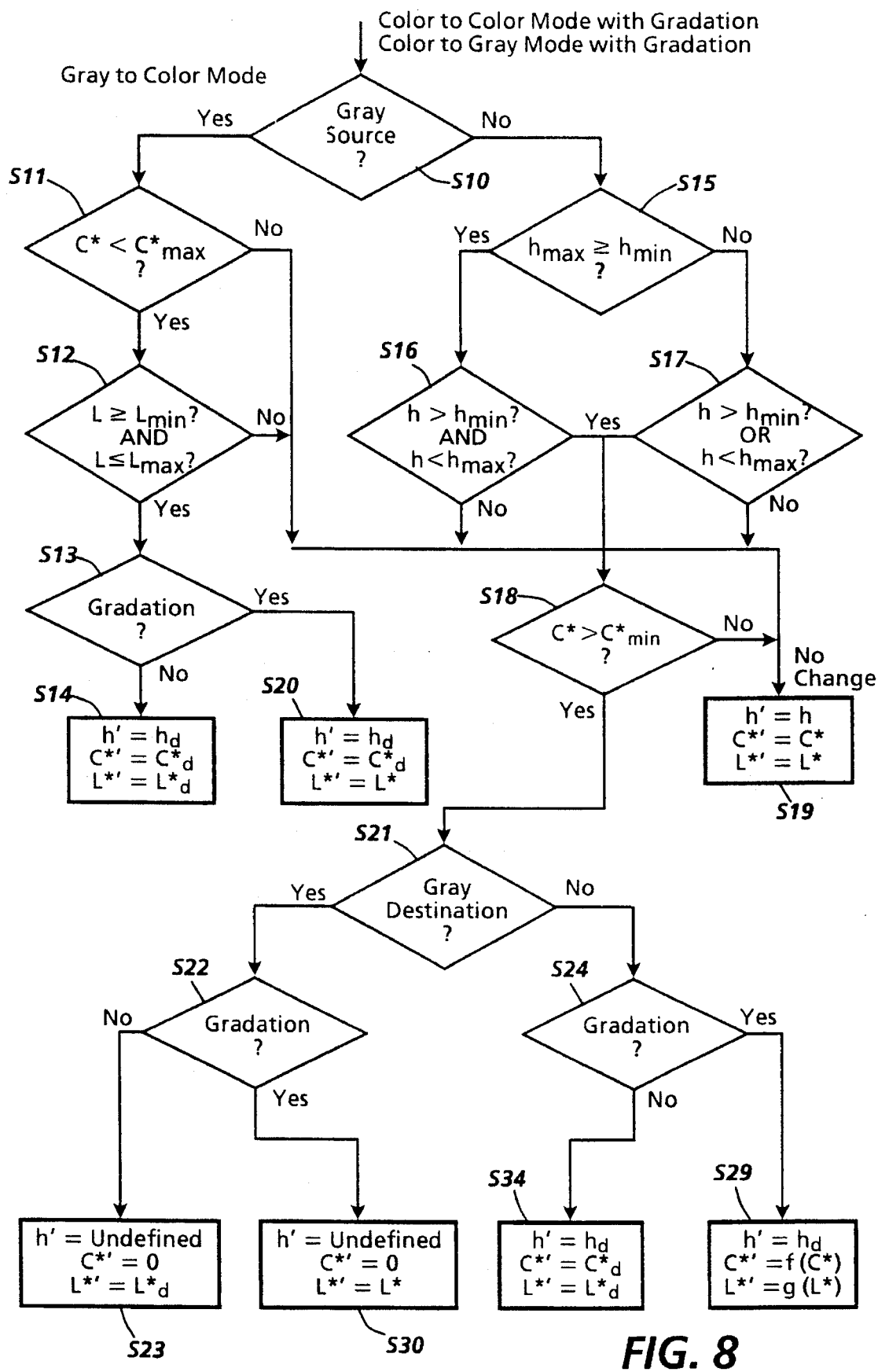
FIG. 8 illustrates a flow chart showing a further embodiment of FIG. 7 which includes the determination of a minimum chroma value.

FIG. 8 illustrates a fifth embodiment of the present invention. In FIG. 8, the method steps having the same labels perform the same functions as described above with respect to FIGS. 4, 5, 6, and 7. FIG. 8 modifies FIG. 7 with the addition of a chroma minimum value determination.

More specifically, if the hue value of the pixel in question meets the conditions of either step S16 or step S17, step S18 determines whether the chroma value of the pixel in question is greater than a minimum chroma value ($C^*_{min}$). If step S18 determines that the chroma value of the pixel in question is not greater than $C^*_{min}$, the hue, chroma, and lightness values remain unchanged as discussed above with respect to step S19. On the other hand, if the chroma value of the pixel in question is greater than $C^*_{min}$, step S21 determines whether the destination color is a gray destination. If step S21 determines that the destination color is a gray destination, the remaining process is the same as described with respect to FIG. 7 beginning at step S22.

The establishing of the hue, chroma, and lightness values at step S29 in FIGS. 4–8 will be discussed using the illustrated examples of FIGS. 14–16. In all the embodiments discussed above, these examples can be utilized to establish the destination values.

The relationship between the chroma value of the pixel in question and the chroma value for the destination color can be realized in many ways. Also, the relationship between the lightness value of the pixel in question and the lightness value for the destination color can be realized in many ways.

Figure 14:
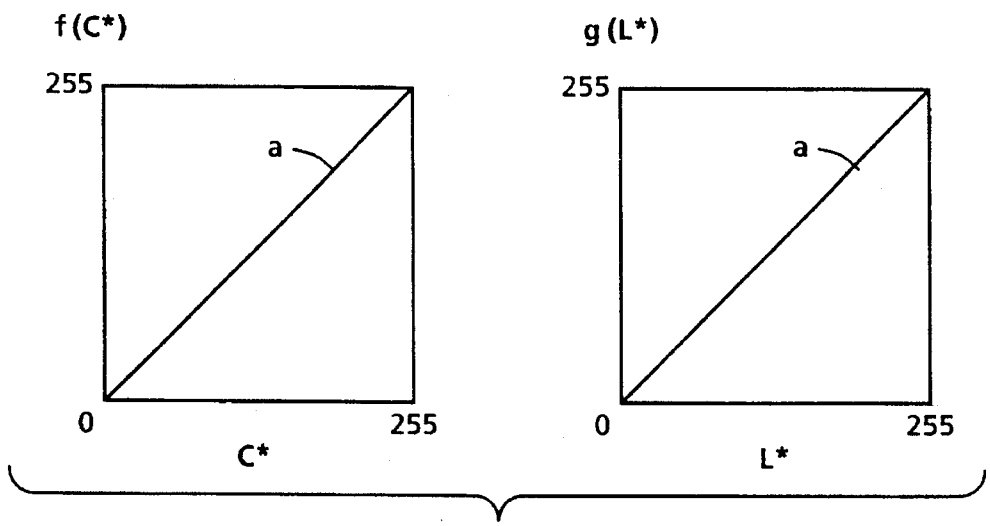
FIG. 14 illustrates a graphical representation showing a functional relationship between source chroma and lightness values and destination chroma and lightness values according to one embodiment of the present invention.

For example, as illustrated in FIG. 14, the relationship between the two chroma values could be a straight line between the points 0 and 255 wherein 0 represents gray and 255 represents the most pure hue color, and the relationship between the two lightness values could also be a straight line between the points 0 and 255 wherein 0 represents black and 255 represents white. These relationships can easily be established through ongoing calculations or look-up tables. In this example, the chroma and lightness values of the pixel in question are directly mapped to destination chroma and lightness values. In this relationship, the chroma and lightness values of the selected source color and the chroma and lightness values of the selected destination color do not affect the respective mapping functions. In other words, the chroma and lightness values of the pixel in question are not mapped through the chroma and lightness values of the selected source color and the chroma and lightness values of the selected destination color in this embodiment.

Figure 15A:
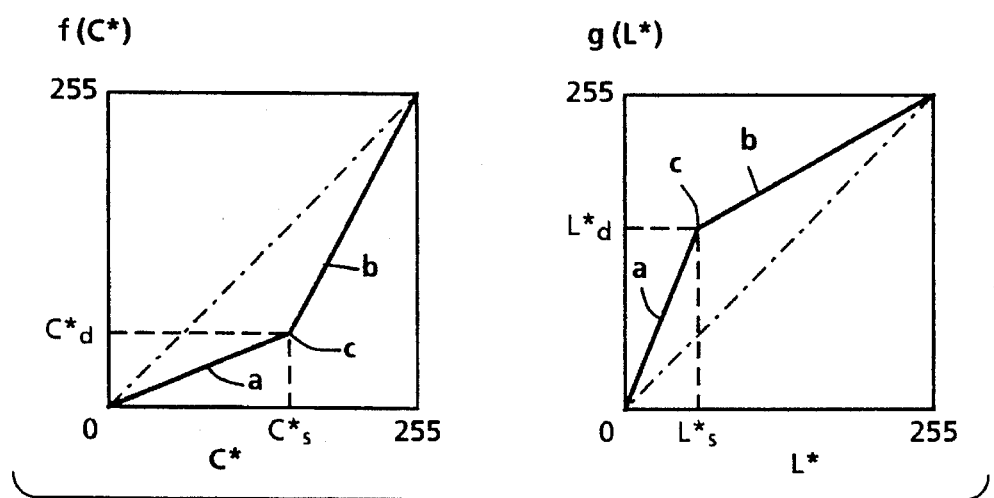
FIGS. 15(A) and 15(B) illustrate graphical representations of functional relationships between source chroma and lightness values and destination chroma and light values according to a preferred embodiment of the present invention.
Figure 15B:
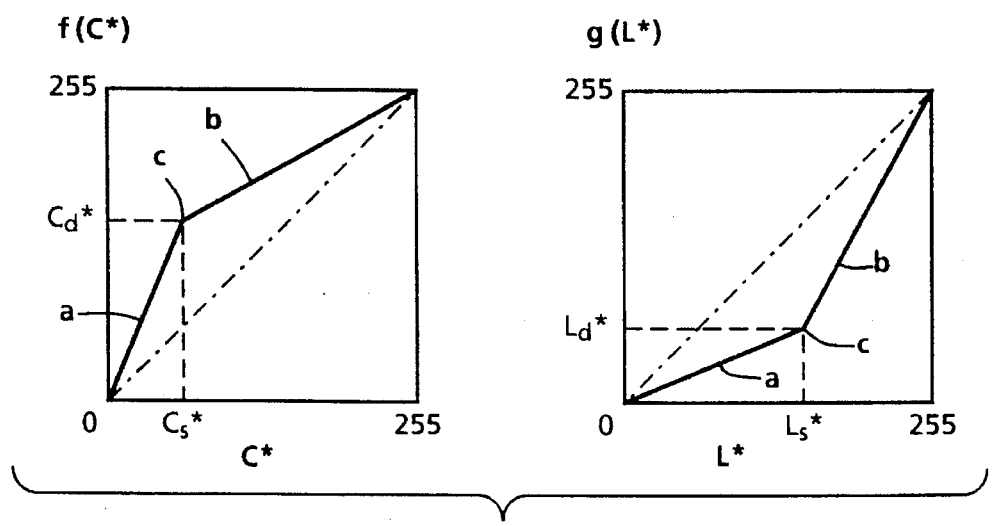

On the other hand, the relationship between the chroma and lightness values of the pixel in question and the destination chroma and lightness values may be mapped through the chroma and lightness values of the selected source color and the chroma and lightness values of the selected destination color. Such a mapping technique is represented by a "rubber band" transformation as illustrated in FIGS. 15(A) and 15(B).

With respect to the "rubber band" transformation, the actual chroma and lightness values for the selected source color and the chroma and lightness values of the designated color are an integral part of the mapping function. In this embodiment, the actual chroma and lightness values for the selected source color are, initially, mapped directly to the chroma and lightness values of the designated color (point c).

Using the mapping of the chroma values as an example, the mapping function of the "rubber band" transformation will be explained. The remaining chroma values, the chroma values other than the chroma values for the selected source and destination color, are mapped utilizing a first straight line (line a) connecting the point representing pure gray to the exact mapped point (c) and a second straight line (line b) connecting the exact mapped point (c) to the point representing a pure hue. In other words, the chroma values which are less than the chroma value of the selected source color (point c) are mapped according to a first function (line a), and the chroma values greater than the chroma value of the selected source color (point c) are mapped utilizing a second function (line b). In this way, the chroma values of the selected source and destination colors are integrated into the mapping function such that the mapping function is dependent upon these values, unlike the mapping function of FIG. 14. This mapping function is also equally applicable to the mapping of the lightness values.

The mapping takes on the characteristics of a rubber band being originally extended between two points (in case of the chroma mapping, the two points are gray and pure hue) and which has been stretched to a third point (point c), the point established by the chroma values of the selected source and destination colors) outside the original path of extension (the dotted line or mapping function of FIG. 14). By using this type of transformation to map the chroma and lightness values, the negative effects of the different average chroma and lightness values for the source and destination colors in a color to color conversion process can be significantly reduced or effectively overcome.

FIGS. 15(A) and 15(B) represent only two possibilities for implementing the "rubber band" transformation. More specifically, the apex (point c) of each transformation (function) could be below or above the dotted line (the dotted line representing the direct mapping of FIG. 14). Also, the chroma value could be directly mapped as in FIG. 14, and the lightness value established as illustrated in FIGS. 15(A) and 15(B), or the lightness value could be directly mapped as in FIG. 14, and the chroma value established as illustrated in FIGS. 15(A) and 15(B). The type of mapping for the individual values is interchangeable.

Furthermore, the relationship between the chroma and lightness values of the pixel in question the destination chroma and lightness values may be mapped through the chroma and lightness values of the selected source color and the chroma and lightness values of the selected destination color as follows. The chroma and lightness values for the selected source color are mapped directly to the chroma and lightness values of the designated color. The remaining chroma and lightness values are mapped utilizing exponential functions or other n-th degree polynomials where n may be greater than two.

Using the chroma mapping as an example, the mapping function of this embodiment will be discussed. A first exponential function connects the point representing pure gray to the exact mapped point, and a second exponential function connects the exact mapped point to the point representing a pure hue. In other words, the chroma values which are less than the chroma value of the selected source color are mapped according to a first exponential function or other n-th degree polynomial, and the chroma values greater than the chroma value of the selected source color are mapped utilizing a second exponential function or other n-th degree polynomial. Again, the chroma values of the selected source and destination colors are integrated into the mapping function such that the mapping function is dependent upon these values, unlike the mapping function of FIG. 14. This mapping function is also equally applicable to the mapping of the lightness values. This transformation allows an initial slower approach with a quicker convergence between the two end points and the exact mapped point.

The relationship between the chroma and lightness values of the pixel in question and the destination chroma and lightness values may also be represented as follows. The chroma and lightness values for the selected source color are mapped directly to the chroma and lightness values of the designated color. The remaining chroma and lightness values are mapped utilizing exponential functions or other n-th degree polynomials where n is greater than two and a straight line.

Using the chroma mapping as an example, a first exponential function connects the point representing pure gray to the exact mapped point, and a straight line connects the exact mapped point to the point representing a pure hue. In other words, the chroma values which are less than the chroma value of the selected source color are mapped according to the first exponential function or other n-th degree polynomial, and the chroma values greater than the chroma value of the selected source color are mapped utilizing a straight line. The chroma values of the selected source and destination colors are integrated into the mapping function such that the mapping function is dependent upon these values, unlike the mapping function of FIG. 14. This mapping function is also equally applicable to the mapping of the lightness values. This transformation allows an initial slower approach with a quicker convergence between the gray point and the exact mapped point and a more direct convergence between the exact mapped point and the pure hue point.

Figure 16:
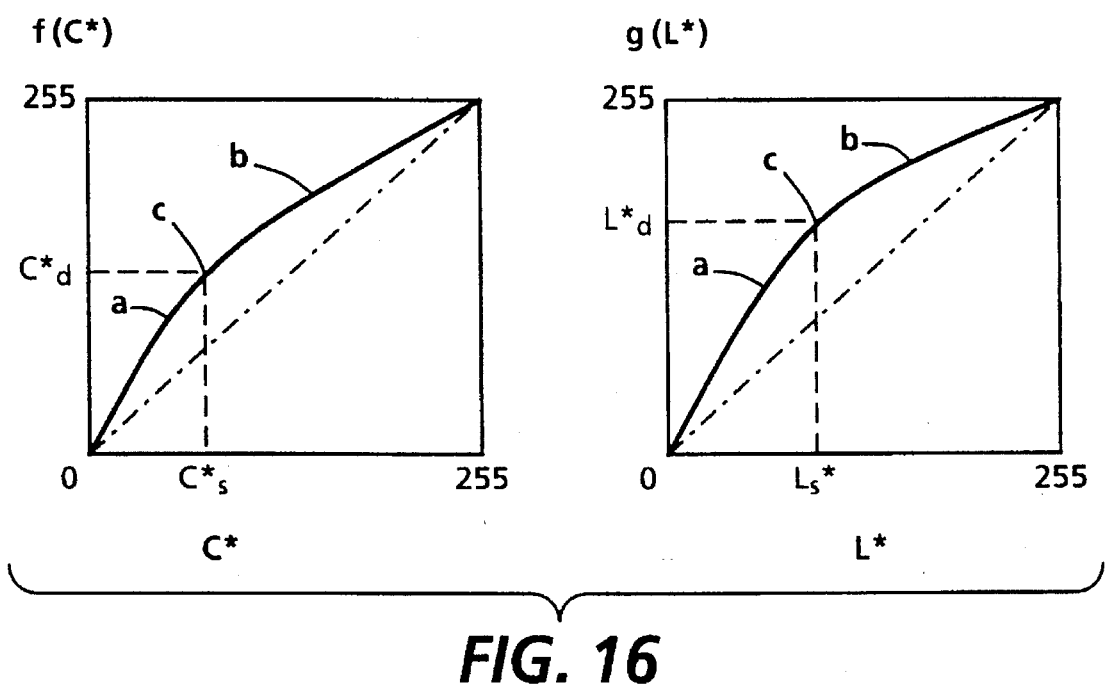
FIG. 16 illustrates graphical representations showing functional relationships between source chroma and lightness values and destination chroma and lightness values according to still another embodiment of the present invention.

Lastly, the relationship between the chroma and lightness values of the pixel in question and the destination chroma and lightness values may be represented as illustrated in FIG. 16. In FIG. 16, the chroma and lightness values for the selected source color are mapped directly to the chroma and lightness values of the designated color (point c). The remaining chroma and lightness values are mapped utilizing a function which fits the three points (the two end points and the exact mapped point (c)).

Using the chroma mapping as an example, the function, as illustrated in FIG. 16, is fitted between the point representing pure gray, the exact mapped point (c), and the point representing a pure hue. The chroma values of the selected source and destination colors are integrated into the mapping function such that the mapping function is dependent upon these values, unlike the mapping function of FIG. 14. This mapping function is also equally applicable to the mapping of the lightness values. This transformation allows a more natural or gradual approach between the end points and the exact mapped point (c).

Figure 9:
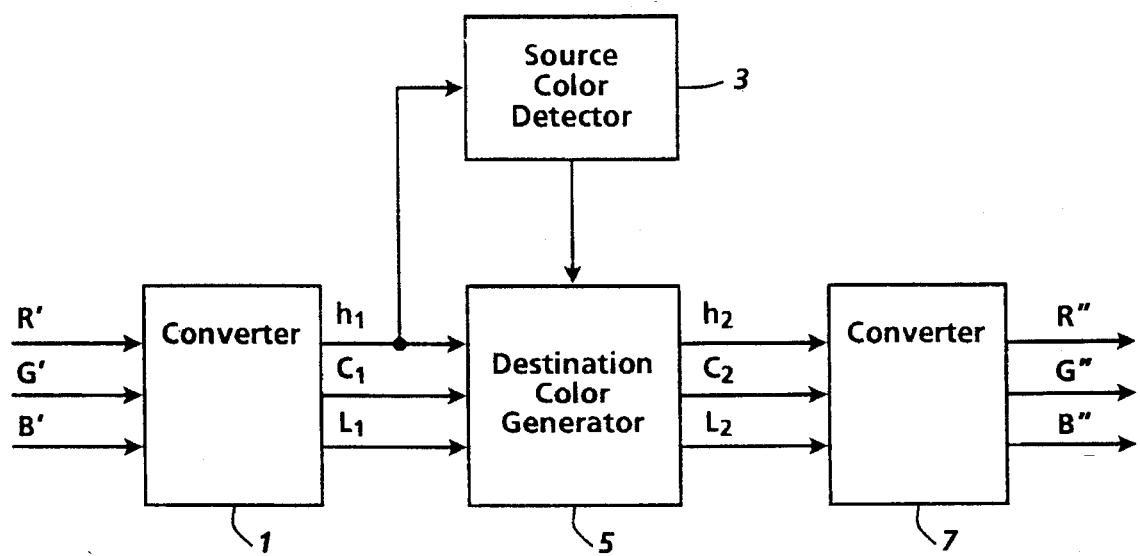
FIG. 9 shows a block diagram illustrating a basic embodiment of the present invention.

FIG. 9 illustrates a block diagram showing a basic embodiment of the present invention. In this block diagram, RGB data from a pixel in question is fed into a first converter 1. This first converter converts the RGB data into a color space represented by lightness chroma and hue ($L^*C^*h$). However, it is noted that the RGB data can also be converted into other color spaces like the Munsell color specification, HSV, HLS, or HSI space without affecting the operations of the present invention. In the preferred embodiment of the present invention, the RGB data is converted to the polar form of $L^*a^*b^*$, $L^*C^*h$.

Upon being converted to the color space format, the values are fed into a destination color generator circuit 5. This destination color generator circuit 5 generates destination hue ($h_2$), chroma ($C^*_2$), and lightness ($L^*_2$) values based upon the hue ($h_1$), chroma ($C^*_1$), and lightness ($L^*_1$) values inputted thereto and control signals inputted from a source color detector circuit 3. The source color detector circuit 3 monitors the hue ($h_1$) and chroma ($C^*_1$) values outputted from the first converter 1 to determine what type of destination values are to be generated by the destination color generator circuit 5. In accordance with the control signals, the destination color generator circuit 5 generates the proper hue ($h_2$), chroma ($C^*_2$), and lightness ($L^*_2$) values for the present invention. The destination hue ($h_2$), chroma ($C^*_2$), and lightness ($L^*_2$) values are fed into a second converter 7 which converts the color space back to RGB data which can be further processed to enable a reproduction of the image being inputted into the initial converter 1 with the proper color modifications.

Figure 10:
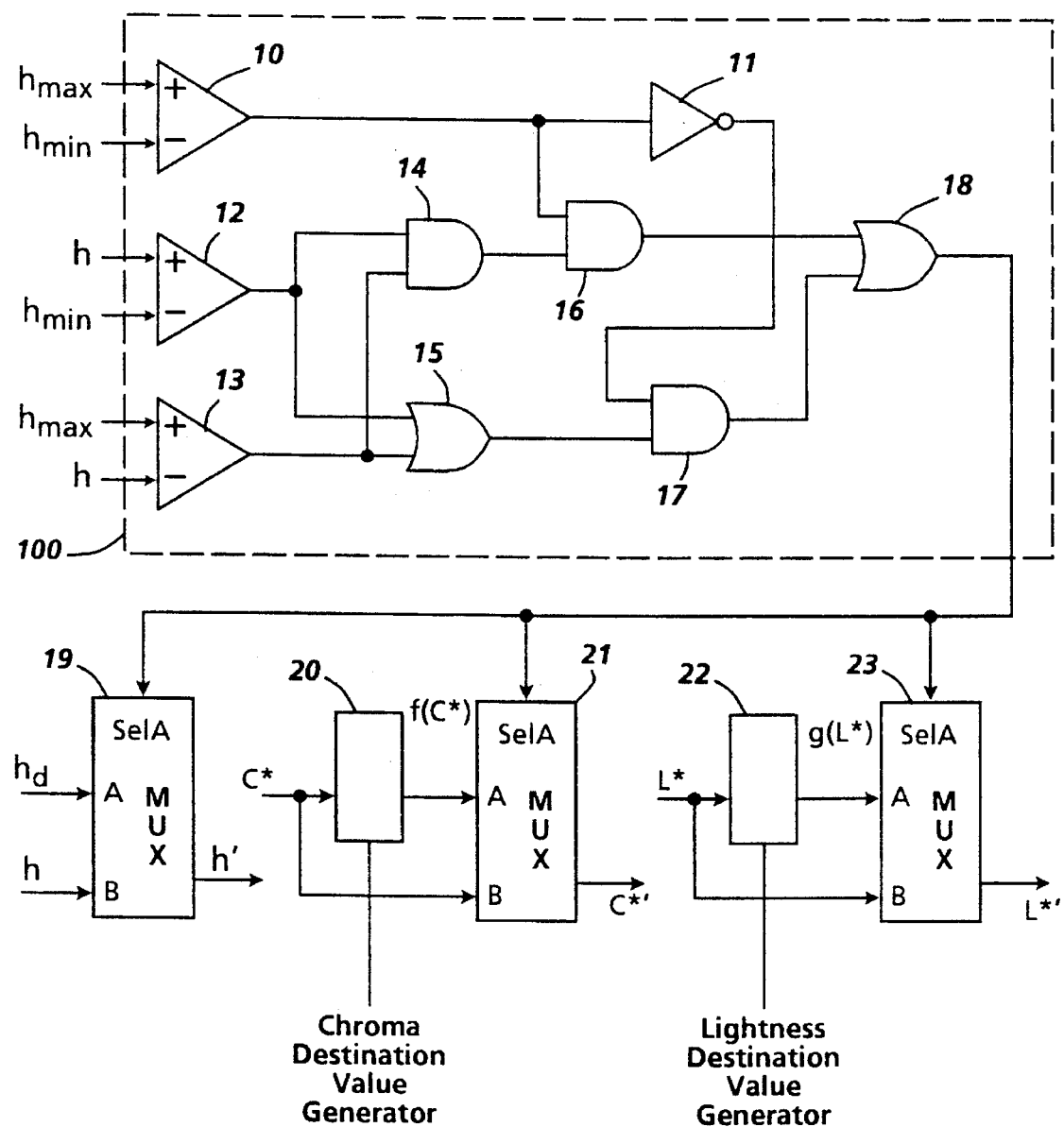
FIG. 10 illustrates a block diagram showing a hardwired circuit for the embodiment illustrated in FIG. 4.

FIG. 10 illustrates a block diagram showing a hardwire circuit for the process illustrated in FIG. 4. In this illustration, a logic circuit 100 makes an initial determination as whether the hue value of the pixel in question is within a hue window corresponding to the selected source color. To make this determination, the hue value of the pixel in question is fed into the logic circuit as well as the hue maximum value of the hue window and the hue minimum value of the hue window of the selected source color. Using the logic elements as illustrated, the logic circuit 100 will produce a high signal when the hue value of the pixel in question is within the hue window and produce a low signal when the hue value of the pixel in question is outside the hue window. The logic circuit 100 includes comparators 10, 12, and 13 which compare the hue window maximum with the hue window minimum, the hue window minimum with the hue value of the pixel, and the hue window maximum with the hue value of the pixel in question, respectfully. The AND gates 14, 16 and 17 with the OR gates 15 and 18, along with inverter 11, produce the output signal discussed above from the outputs of the three comparators 10, 12, and 13.

The output signal from the logic circuit 100 is fed into multiplexers 19, 21, and 23. Multiplexer 19 selects either the hue value of the pixel in question or the hue value of the destination color depending upon the state of the signal inputted from the logic circuit 100. More specifically, multiplexer 19 selects the destination hue value when the logic circuit 100 determines that the hue value of the pixel in question is within the hue window of the selected source color.

Multiplexer 21 selects either the output of the chroma destination value generator 20 or the chroma value of the pixel in question depending upon the state of the control signal received from the logic circuit 100. More specifically, multiplexer 21 selects the chroma value from the chroma destination value generator 20 when the logic circuit 100 determines that the hue value of the pixel in question is within the hue window of the selected source color.

The multiplexer 23 selects either the output from the lightness destination value generator 22 or the lightness value of the pixel in question depending upon the state of the control signal outputted from the logic circuit 100. More specifically, the multiplexer 23 selects the output from the lightness destination value generator 22 when the logic circuit 100 determines that the hue value of the pixel in question is within the hue window.

The chroma destination value generator 20 converts the chroma value of the pixel in question into a destination chroma value utilizing either a look up table or a predetermined set of formulas to establish the relationship between the chroma value of the pixel in question being inputted and the chroma value to be outputted for the designated color. In other words, the relationship can be stored in a read only memory (ROM) as a look-up table or can be continually generated utilizing a plurality of formulas. The plurality of formulas allow flexibility in editing the chroma value being generated for the destination color.

Figure 11:
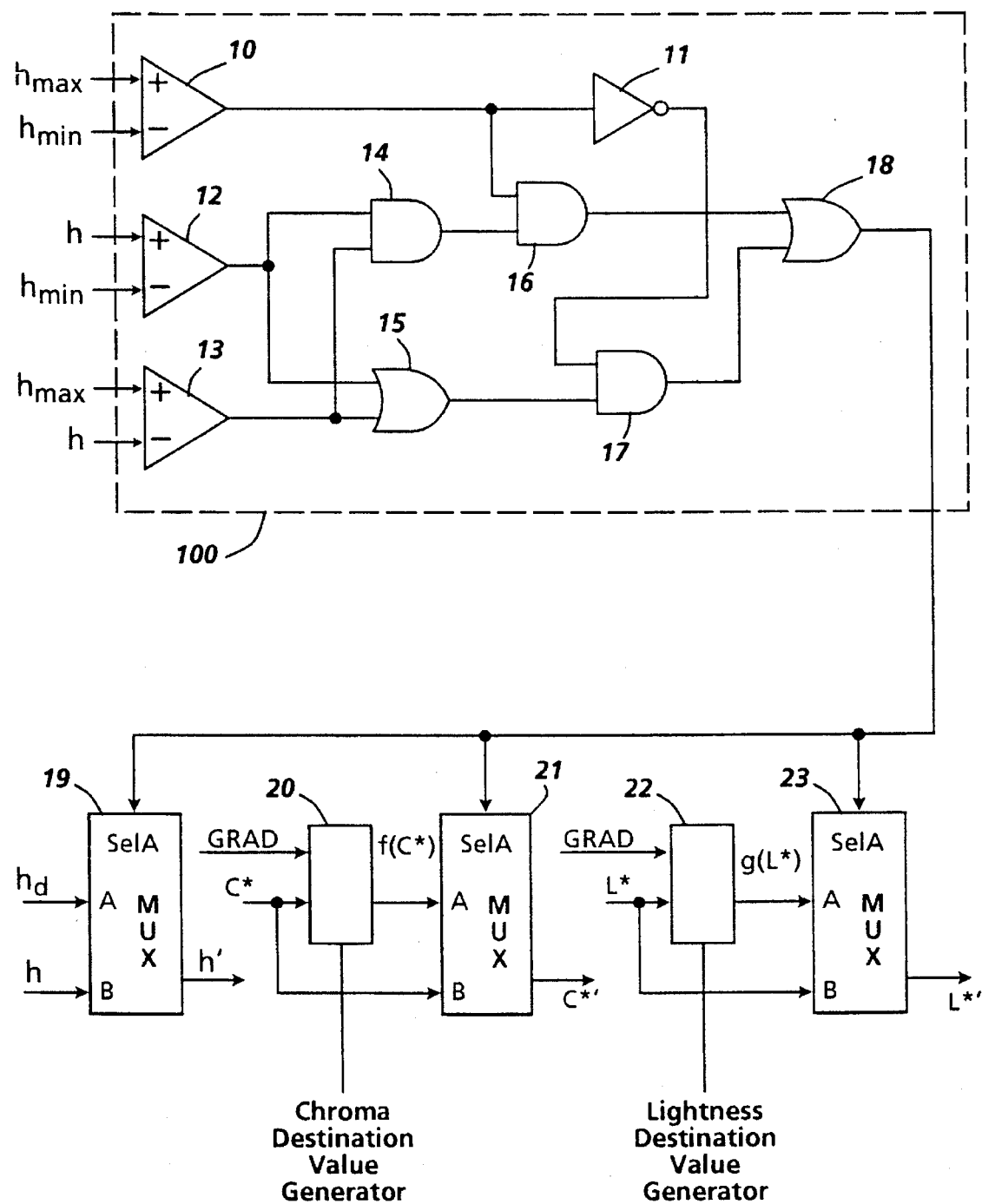
FIG. 11 illustrates a block diagram showing a hardwired circuit for the embodiment illustrated in FIG. 5.
Figure 12:
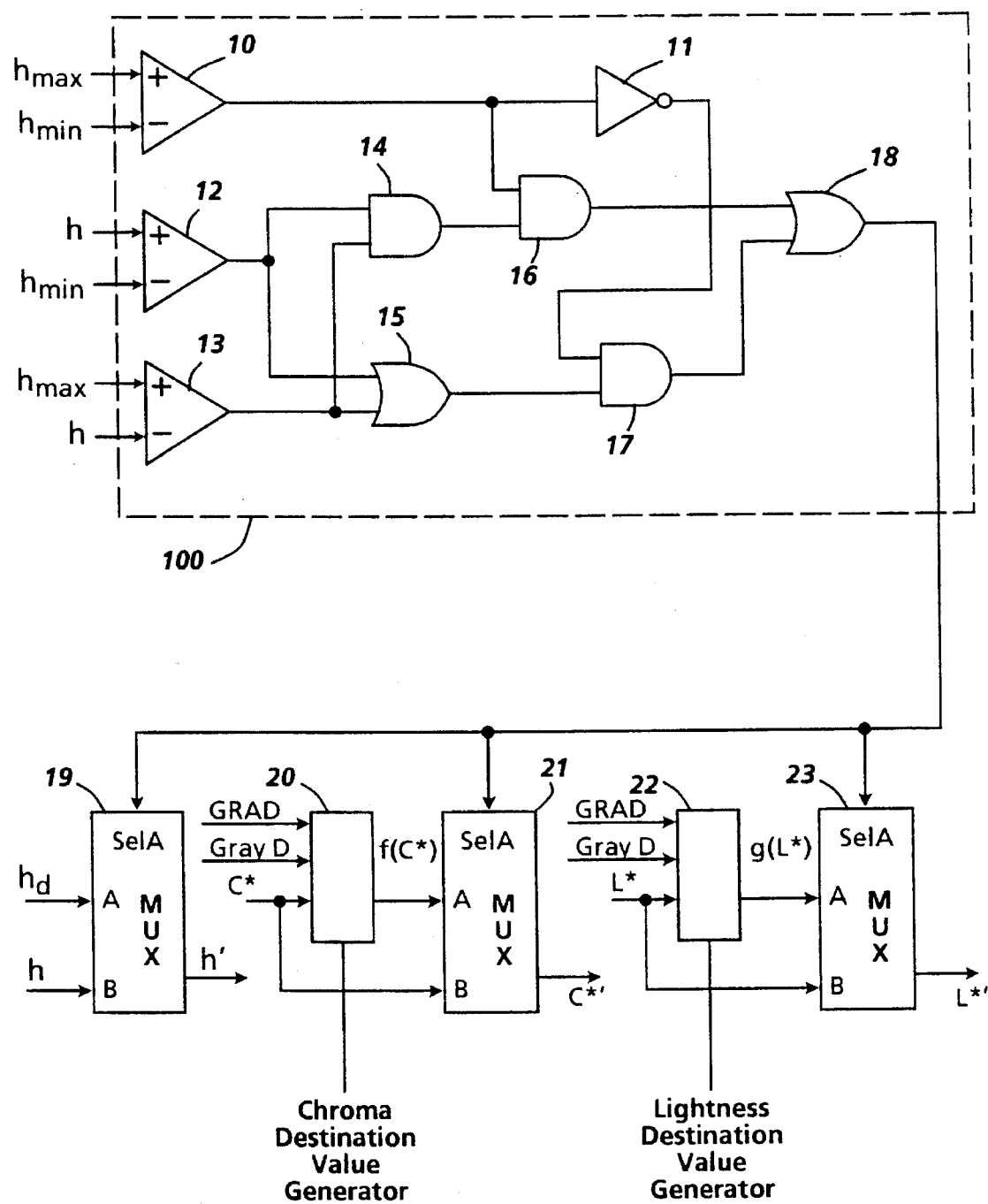
FIG. 12 illustrates a block diagram showing a hardwired circuit for the embodiment illustrated in FIG. 6.
Figure 13:
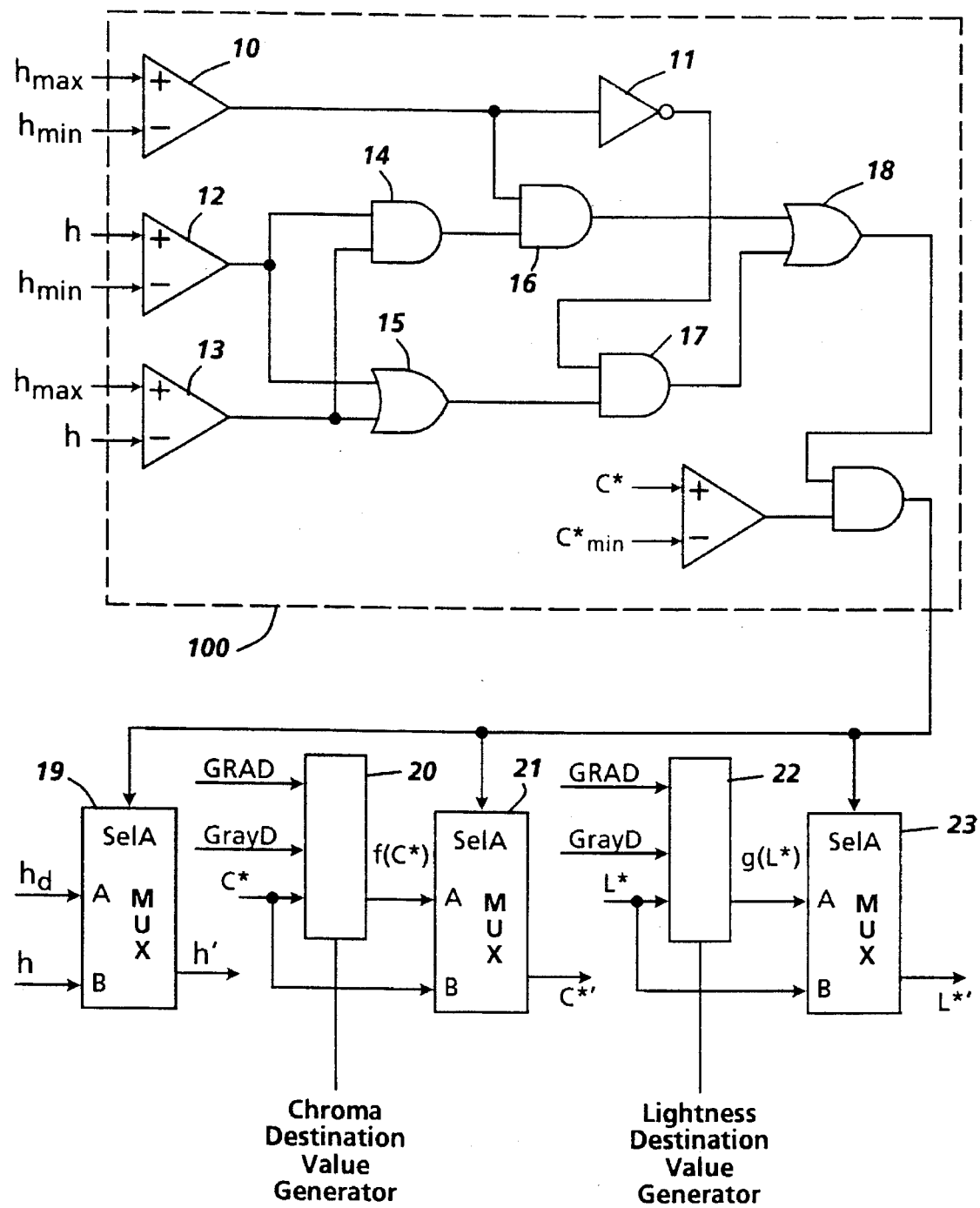
FIG. 13 illustrates a block diagram of a hardwired circuit for the embodiment illustrated in FIGS. 7 and 8.

FIGS. 11, 12, and 13 illustrate various modifications to FIG. 10. For example, FIG. 11 includes a gradation signal input to the chroma and lightness destination value generators 20 and 22 to enable a greater variety of outputs from these devices. If the gradation signal is off, the chroma and lightness value generators will generate constant values of output corresponding to the chroma and lightness of the destination color. FIG. 12 includes a gradation signal input and a gray destination signal input to the chroma and lightness destination value generators 20 and 22 to enable a greater variety of outputs from these devices. If the gray destination signal is on, the chroma and lightness value generators will generate a zero chroma value and a lightness destination value dependent upon the gradation requirement as shown in FIG. 6. Lastly, FIG. 13 includes a gradation signal input and a gray destination signal input to the chroma and lightness destination value generators 20 and 22 and a chroma minimum value detection to enable a greater variety of outputs from these devices.

Although the present invention has been described in detail above, various modifications can be implemented without imparting from the spirit. For example, the present invention has been described in detail with respect to utilization of $L^*C^*h$ base; however, the color to color conversion process can be utilized using HLS, HSV, HSI, and the Munsell color specification space, as well as any other radiant color spaces to perform the proper color conversion. In the preferred embodiment, a $L^*C^*h$ base is utilized because this base offers the advantage of more uniformity in the hue window specification for the different colors.

Also, the mapping functions, although only described in detail with respect to a few embodiments, may incorporate any type of function wherein the selected source chroma and lightness values and the selected destination chroma and lightness values are made an integral part of the functions; i.e., the functions are dependent upon these values. Moreover, the mapping can more sophisticated by having more than one selected source chroma value, selected source lightness value, selected destination chroma value, and selected destination lightness value. For example, the user may select two source colors of the same hue, thus, producing two selected source chroma values. In this example, the "rubber band" transformation would consist of three lines with respect to the mapping function. Therefore, the present invention is not limited to the selection of only one source color and one destination color having a same hue.

Moreover, the present invention has been described in utilization with respect to digital copiers, the present invention can be utilized in any device which requires the conversion of a color image to another color. Lastly, the mapping of the source chroma and lightness values to the destination chroma and lightness value can be realized utilizing a variety of functions and/or combination of functions to achieve the desired gradation in the final destination product.

While the invention has been described with reference to the various embodiments disclosed above, it is not confined to the details set forth above, but is intended to cover such modifications or changes as may come within the scope of the attached claims.

What is claimed is:

1. A system for changing a color corresponding to a source color to a destination color, comprising:

first input means for selecting a target source color and a destination color;

first converting means, operatively connected to said first input means, for converting the input target source color to a source hue value, a source chroma reference value, and a source lightness reference value and the input destination color to a destination hue value, a destination chroma reference value, and a destination lightness reference value;

first table means, operatively connected to said first converting means, for generating a first set of values representing a source to destination chroma relationship for sources values in a range from the source chroma reference value to a minimum source chroma value using a first function;

second table means, operatively connected to said first converting means, for generating a second set of values representing a source to destination chroma relationship for source values in a range from the source chroma reference value to a maximum source chroma value using a second function;

chroma memory means, operatively connected to said first and second table means, for storing the first set of values and the second set of values;

second input means for receiving color data;

second converting means, operatively connected to said second input means, for converting the received color data to a color hue value, a color chroma value, and a color lightness value;

comparing means, operatively connected to said first and second converting means, for determining if the color hue value corresponds to the source hue value;

chroma data generating means, operatively connected to said second converting means, said chroma memory means, and said comparing means, for selecting a destination chroma value associated with the source chroma value that corresponds to the color chroma value based on the source to destination chroma relationship stored in said chroma memory means when said comparing means determines that the color hue value corresponds to the source hue value;

third table means, operatively connected to said first converting means, for generating a third set of values representing a source to destination lightness relationship for values in a range from the source lightness reference value to a minimum source lightness value using a third function;

fourth table means, operatively connected to said first converting means, for generating a fourth set of values representing a source to destination lightness relationship for values in a range from the source lightness reference value to a maximum source lightness value using a fourth function;

lightness memory means, operatively connected to said third and fourth table means, for storing the third and fourth sets of values;

lightness data generating means, operatively connected to said second converting means, said lightness memory means, and said comparing means, for selecting a destination lightness value associated with the source lightness value that corresponds to the color lightness value based on the source to destination lightness relationship stored in said lightness memory means when said comparing means determines that the color hue value corresponds to the source hue value; and third converting means, operatively connected to said lightness data generating means and said chroma data generating means, for converting the destination hue value and the selected destination chroma and lightness values into output color data representing the destination color.

2. The system as claimed in claim 1, wherein the first, second, third, and fourth functions are distinct polynomials having at least one degree.

3. The system as claimed in claim 2, wherein the first function is graphically represented by a locus of points that form a first straight line from the minimum source value to the source chroma reference value, the second function is graphically represented by a locus of points that form a second straight line from the maximum source value to the source chroma reference value, the third function is graphically represented by a locus of points that form a third straight line from the minimum source value to the source lightness reference value, and the fourth function is graphically represented by a locus of points that form a fourth straight line from the maximum source value to the source lightness reference value.

4. A system for changing a color corresponding to a source color to a destination color, comprising:

first input means for selecting a target source color and a destination color;

first converting means, operatively connected to said first input means, for converting the inputted target source color to a source hue value, a source chroma reference value, and a source lightness reference value and the inputted destination color to a destination hue value, a destination chroma reference value, and a destination lightness reference value;

first table means, operatively connected to said first converting means, for generating a first set of values representing a source to destination lightness relationship for sources values in a range from the source lightness reference value to a minimum source lightness value using a first function;

second table means, operatively connected to said first converting means, for generating a second set of values representing a source to destination lightness relationship for source values in a range from the source lightness reference value to a maximum source lightness value using a second function;

lightness memory means, operatively connected to said first and second table means, for storing the first set of values and the second set of values;

second input means for receiving color data;

second converting means, operatively connected to said second input means, for converting the received color data to a color hue value, a color chroma value, and a color lightness value;

comparing means, operatively connected to said second converting means, for determining if the color hue value corresponds to the source hue value;

lightness data generating means, operatively connected to said comparing means, said second converting means, and said lightness memory means, for selecting a destination lightness value associated with the source lightness value that corresponds to the color lightness value based on the source to destination lightness relationship stored in said lightness memory means when said comparing means determines that the color hue value corresponds to the source hue value; and third converting means, operatively connected to said lightness data generating means, for converting the destination hue value and the selected destination lightness value into output color data representing the destination color.

5. A system for changing a color corresponding to a source color to a destination color, comprising:

first input means for selecting a target source color and a destination color;

first converting means, operatively connected to said first input means, for converting the inputted target source color to a source hue value, a source chroma reference value, and a source lightness reference value and the inputted destination color to a destination hue value, a destination chroma reference value, and a destination lightness reference value;

first table means, operatively connected to said first converting means, for generating a first set of values representing a source to destination chroma relationship for sources values in a range from the source chroma reference value to a minimum source chroma value using a first function;

second table means, operatively connected to said first converting means, for generating a second set of values representing a source to destination chroma relationship for source values in a range from the source chroma reference value to a maximum source chroma value using a second function;

chroma memory means, operatively connected to said first and second table means, for storing the first set of values and the second set of values;

second input means for receiving color data;

second converting means, operatively connected to said second input means, for converting the received color data to a color hue value, a color chroma value, and a color chroma value;

comparing means, operatively connected to said second converting means, for determining if the color hue value corresponds to the source hue value;

chroma data generating means, operatively connected to said comparing means, said second converting means, and said chroma memory means, for selecting a destination chroma value associated with the source chroma value that corresponds to the color chroma value based on the source to destination chroma relationship stored in said chroma memory means when said comparing means determines that the color hue value corresponds to the source hue value; and third converting means, operatively connected to said chroma data generating means, for converting the destination hue value and the selected destination chroma value into output color data representing the destination color.

6. A method of electronically generating color destination values to be used in a color conversion process, comprising the steps of:

(a) selecting a source color and a corresponding destination color;

(b) converting, electronically, the selected source color into first, second, and third source values representing a three-dimensional color space;

(c) converting, electronically, the selected destination color into first, second, and third destination values representing a same three-dimensional color space as produced in said step (b);

(d) generating a first set of second destination values corresponding to a source to destination relationship for second source values in a range from the second source value generated in said step (b) to a predetermined minimum second source value using a first function;

(e) generating a second set of second destination values corresponding to a source to destination relationship for second source values in a range from the second source value generated in said step (b) to a predetermined maximum second source value using a second function; and (f) storing the first and second sets of second destination values in a memory as a look-up table to be used when converting color data corresponding to the selected source color to the selected destination color.

7. The method as claimed in claim 6, further comprising the steps of:

(g) generating a first set of third destination values corresponding to a source to destination relationship for third source values in a range from the third source value generated in said step (b) to a predetermined minimum third source value using a third function;

(h) generating a second set of third destination values corresponding to a source to destination relationship for third source values in a range from the third source value generated in said step (b) to a predetermined maximum third source value using a fourth function; and (i) storing the first and second sets of third destination values in a memory as a look-up table to be used when converting color data corresponding to the selected source color to the selected destination color.

8. The method as claimed in claim 7, wherein the second source value is a source lightness value, the third source value is a source chroma value, the second destination value is a destination lightness value, and the third destination value is a destination chroma value.

9. The method as claimed in claim 8, wherein the first, second, third, and fourth functions are distinct polynomials having at least one degree.

10. The method as claimed in claim 7, wherein the first function is graphically represented by a locus of points that form a first straight line from the predetermined minimum second source value to the second target source value, the second function is graphically represented by a locus of points that form a second straight line from the predetermined maximum second source value to the second target source value, the third function is graphically represented by a locus of points that form a third straight line from the predetermined minimum third source value to the third target source value, and the fourth function is graphically represented by a locus of points that form a fourth straight line from the predetermined maximum third source value to the third target source value.

11. A system for changing a color corresponding to a target source color to a destination color, comprising:

first input means for selecting a target source color and a corresponding target destination color;

first converting means, operatively connected to said first input means, for converting the selected target source color into first, second, and third target source values representing a three-dimensional color space, the first target source value representing a source hue value, and the selected target destination color into first, second, and third target destination values representing the three-dimensional color space, the first target destination value representing a destination hue value;

second input means for receiving color data;

second converting means, operatively connected to said second input means, for converting the received color data into first, second, and third color values representing the three-dimensional color space, the first color value representing a hue value;

comparing means, operatively connected to said second converting means, for determining if the first color value corresponds to the first target source value;

second destination value generating means, operatively connected to said second converting means, for generating a second destination value using a first function when the second color value is in a range from the second source target value to a predetermined minimum second source value;

said second destination value generating means generating the second destination value using a second function when the second color value is in a range from the second source target value to a predetermined maximum second source value; and output means, operatively connected to said second converting means and said comparing means, for generating output color data representing the destination color based on the first destination target value and the second destination value generated by said second destination value generating means when said comparing means determines that the first color value corresponds to the first source target value.

12. The system as claimed in claim 11, wherein the second source value is a source lightness value, the third source value is a source chroma value, the second destination value is a destination lightness value, and the third destination value is a destination chroma value.

13. The system as claimed in claim 11, wherein the first and second functions are distinct polynomials having at least one degree.

14. The system as claimed in claim 11, further comprising:

third destination value generating means, operatively connected to said second converting means, for generating a third destination value using a third function when the third color value is in a range from the third target source value to a predetermined minimum third source value and for generating the third destination value using a fourth function when the third color value is in a range from the third target source value to a predetermined maximum third source value;

said output means generating output color data representing the destination color based on the first destination target value and the generated second and third destination values when said comparing means determines that the first color value corresponds to the first target source value.

15. The system as claimed in claim 14, wherein said second destination value generating means comprises:

first calculating means, operatively connected to said first converting means, for generating a first set of second destination values corresponding to a source to destination relationship for second source values in a range from the second source value produced by said converter means to a predetermined minimum second source value using the first function;

second calculating means, operatively connected to said first converting means, for generating a second set of second destination values corresponding to a source to destination relationship for second source values in a range from the second source value produced by said converter means to a predetermined maximum second source value using the second function; and a first memory, operatively connected to said first and second calculating means, to store the first set of second destination values and the second set of second destination values in a look-up table format and to output a value corresponding to the second color value;

said output means generating output color data representing the destination color based on the first destination target value and the second destination value outputted by said first memory when said comparing means determines that the first color value corresponds to the first target source value.

16. The system as claimed in claim 15, wherein said third destination value generating means comprises:

third calculating means, operatively connected to said first converting means, for generating a third set of third destination values corresponding to a source to destination relationship for third source values in a range from the third source value produced by said converter means to a predetermined minimum third source value using the third function;

fourth calculating means, operatively connected to said first converting means, for generating a fourth set of third destination values corresponding to a source to destination relationship for third source values in a range from the third source value produced by said converter means to a predetermined maximum third source value using the fourth function; and a second memory, operatively connected to said third and fourth calculating means, to store the third set of second destination values and the fourth set of second destination values in a look-up table format and to output a value corresponding to the third color value;

said output means generating output color data representing the destination color based on the first destination target value and the second and third destination value outputted by said first and second memories when said comparing means determines that the first color value corresponds to the first target source value.

17. The system as claimed in claim 16, wherein the first function is graphically represented by a locus of points that form a first straight line from the predetermined minimum second source value to the second target source value, the second function is graphically represented by a locus of points that form a second straight line from the predetermined maximum second source value to the second target source value, the third function is graphically represented by a locus of points that form a third straight line from the predetermined minimum third source value to the third target source value, and the fourth function is graphically represented by a locus of points that form a fourth straight line from the predetermined maximum third source value to the third target source value.

18. The system as claimed in claim 16, wherein the first and second functions are portions of a single function graphically represented by a locus of points forming a curve from the predetermined maximum second source value through the second target source value to the predetermined minimum second source value, and the third and fourth functions are portions of a single function graphically represented by a locus of points forming a curve from the predetermined maximum third source value through the third target source value to the predetermined minimum third source value.

19. A method of changing a color corresponding to a target source color to a destination color, comprising the steps of:
  (a) selecting a target source color and a corresponding target destination color;
  (b) converting, electronically, the selected target source color into first, second, and third target source values representing a three-dimensional color space, the first target source value representing a source hue value, and converting, electronically, the selected target destination color into first, second, and third target destination values representing a same three-dimensional color space, the first target destination value representing a destination hue value;
  (c) receiving color data and converting, electronically, the color data into first, second, and third color values representing the same three-dimensional color space, the first color value representing a hue value;
  (d) determining if the first color value corresponds to the first target source value;
  (e) generating a second destination value using a first function when the second color value is in a range from the second source target value to a predetermined minimum second source value;
  (f) generating a second destination value using a second function when the second color value is in a range from the second source target value to a predetermined maximum second source value; and
  (g) generating output color data representing the destination color based on the first destination target value and the generated second destination value when said step (d) determines that the first color value corresponds to the first source target value.

20. The method as claimed in claim 19, further comprising the steps of:
  (i) generating a third destination value using a third function when the third color value is in a range from the third target source value to a predetermined minimum third source value; and
  (j) generating the third destination value using a fourth function when the third color value is in a range from the third target source value to a predetermined maximum third source value;
  said step (g) generating output color data representing the destination color based on the first target destination value and the generated second and third destination values if said step (d) determines that the first color value corresponds to the first target source value and said step (h) determines that a gradation mode has been selected.

21. The method as claimed in claim 20, wherein the second source value is a source lightness value, the second destination value is a destination lightness value, the third source value is a source chroma value, and the third destination value is a destination chroma value.

22. The method as claimed in claim 20, wherein the first, second, third, and fourth functions are distinct polynomials having at least one degree.

23. The method as claimed in claim 20, wherein the first function is graphically represented by a locus of points that form a first straight line from the predetermined minimum second source value to the second target source value, the second function is graphically represented by a locus of points that form a second straight line from the predetermined maximum second source value to the second target source value, the third function is graphically represented by a locus of points that form a third straight line from the predetermined minimum third source value to the third target source value, and the fourth function is graphically represented by a locus of points that form a fourth straight line from the predetermined maximum third source value to the third target source value.

24. The system as claimed in claim 20, wherein the first and second functions are portions of a single function graphically represented by a locus of points forming a curve from the predetermined maximum second source value through the second target source value to the predetermined minimum second source value, and the third and fourth functions are portions of a single function graphically represented by a locus of points forming a curve from the predetermined maximum third source value through the third target source value to the predetermined minimum third source value.

25. A system for converting a color corresponding to a source color to a destination color, comprising:
  first input means for selecting a target source color and a corresponding target destination color;
  first converting means, operatively connected to said first input means, for converting the selected target source color into a first target source value of a three-dimensional color space, the first target source value representing a source hue value, and the selected target destination color into a first destination value in a same three-dimensional color space, the first destination value representing a target destination hue value;
  second input means for receiving color data;
  second converting means, operatively connected to said second input means, for converting the received color data into first, second, and third color values representing the same three-dimensional color space, the first color value representing a color hue value;
  first comparing means, operatively connected to said first and second converting means, for determining if the first color value corresponds to the first target source value;
  second comparing means, operatively connected to said second converting means, for determining if the second color value is within a predetermined range of values;
  second destination value table means, operatively connected to said first and second comparing means, for storing a plurality of second destination values, each second destination value corresponding to a second source value in a range from a predetermined minimum second source value to a predetermined maximum second source value;
  said second destination value table means outputting a second destination value that corresponds to an input second color value, the input second color value being used as the second source value for determining the second destination value when said first comparing means determines that the first color value corresponds to the first target source value and said second comparing means determines that the second color value is within a predetermined range of values; and color data generating means, operatively connected to said second destination value table means, for generating output color data representing the destination color based on the first destination value and the outputted second destination value.

26. The system as claimed in claim 25, further comprising:

third destination value table means, operatively connected to said first and second comparing means, for storing a plurality of third destination values, each third destination value corresponding to a third source value in a range from a predetermined minimum third source value to a predetermined maximum third source value;

said third destination value table means outputting a third destination value that corresponds to an inputted third color value, the inputted third color value being used as the third source value for determining the third destination value when said first comparing means determines that the first color value corresponds to the first target source value and said second comparing means determines that the second color value is within a predetermined range of values;

said color data generating means generating output color data representing the destination color based on the first destination target value and the outputted second and third destination values.

27. The system as claimed in claim 26, wherein:

said plurality of second destination values stored in said second destination table means represent first and second functions, the first function corresponding to a source to destination relationship for second source values in a range from a predetermined minimum second source value to a target second source value and the second function corresponding to a source to destination relationship for second source values in a range from the target second source value to a predetermined maximum second source value, the target second source value representing the second source value for the target source color; and said plurality of third destination values stored in said third destination table means represent third and fourth functions, the third function corresponding to a source to destination relationship for third source values in a range from a predetermined minimum third source value to a target third source value and the fourth function corresponding to a source to destination relationship for third source values in a range from the target third source value to a predetermined maximum third source value, the target third source value representing the third source value for the target source color.

28. The system as claimed in claim 27, wherein the first, second, third, and fourth functions are distinct polynomials having at least one degree.

29. The system as claimed in claim 27, wherein the first function is graphically represented by a locus of points that form a first straight line from the predetermined minimum second source value to the second target source value, the second function is graphically represented by a locus of points that form a second straight line from the predetermined maximum second source value to the second target source value, the third function is graphically represented by a locus of points that form a third straight line from the predetermined minimum third source value to the third target source value, and the fourth function is graphically represented by a locus of points that form a fourth straight line from the predetermined maximum third source value to the third target source value.

30. The system as claimed in claim 27, wherein the first and second functions are portions of a single function graphically represented by a locus of points forming a curve from the predetermined maximum second source value through the second target source value to the predetermined minimum second source value, and the third and fourth functions are portions of a single function graphically represented by a locus of points forming a curve from the predetermined maximum third source value through the third target source value to the predetermined minimum third source value.

* * * * *